(12) United States Patent
Huang

(10) Patent No.: US 6,305,087 B1
(45) Date of Patent: Oct. 23, 2001

(54) SHEARS FOR CUTTING WATER PIPE AND THE LIKE

(75) Inventor: Chin-Chi Huang, Chung Hwa Hsien (TW)

(73) Assignee: Hong Chuan Hsian Industries Co., Ltd., Chung Hwa Hsien (TW)

( * ) Notice: Subject to any disclaimer, the term of this patent is extended or adjusted under 35 U.S.C. 154(b) by 0 days.

(21) Appl. No.: 09/626,769

(22) Filed: Jul. 27, 2000

(51) Int. Cl.[7] ...................................................... B26B 13/00
(52) U.S. Cl. ................................. 30/250; 30/188; 30/258
(58) Field of Search ............................. 30/249–251, 258, 30/188–190, 192

(56) References Cited

U.S. PATENT DOCUMENTS

| 4,644,650 | * | 2/1987 | Laux et al. | 30/250 |
| 4,779,342 | * | 10/1988 | Kobayashi et al. | 30/250 |
| 5,718,051 | * | 2/1998 | Huang | 30/250 |
| 6,154,966 | * | 12/2000 | Kobayashi | 30/250 |

* cited by examiner

Primary Examiner—Douglas D. Watts
(74) Attorney, Agent, or Firm—Harrison & Egbert

(57) ABSTRACT

A pair of shears including a primary handle, a secondary handle, a movable jaw, a connection rod, and a push claw. The primary handle is provided with a fixed jaw. The push claw is actuated by the secondary handle to urge a toothed portion of the movable jaw, thereby resulting in the progressive moment of the movable jaw toward the fixed jaw so as to cut a workpiece held between the fixed jaw and the movable jaw. The movable jaw moves away from the fixed jaw at the time when the secondary handle is moved away from the primary handle so as to actuate the connection rod to pull the lower end of the movable jaw.

1 Claim, 5 Drawing Sheets

SHEARS FOR CUTTING WATER PIPE AND THE LIKE

BACKGROUND OF THE INVENTION

The present invention relates generally to a cutting implement, and more particularly to a pair of shears for cutting the water pipe and the like.

DESCRIPTION OF RELATED ART

The conventional water pipe shears are handy tools for cutting the water pipe of a rigid plastic material; nevertheless they lack certain features enabling the shears to be used with ease.

BRIEF SUMMARY OF THE INVENTION

The primary objective of the present invention is to provide a pair of shears, which can be used with ease to cut the water pipe.

In keeping with the principle of the present invention, the foregoing objective of the present invention is attained by the water pipe shears comprising a primary handle, a secondary handle, a movable jaw, a connection rod, and a push claw. The push claw is actuated by the secondary handle to push the movable jaw to move toward a fixed jaw, thereby resulting in severance of a pipe which is placed between the movable jaw and the fixed jaw.

The foregoing objective, features, functions, and advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
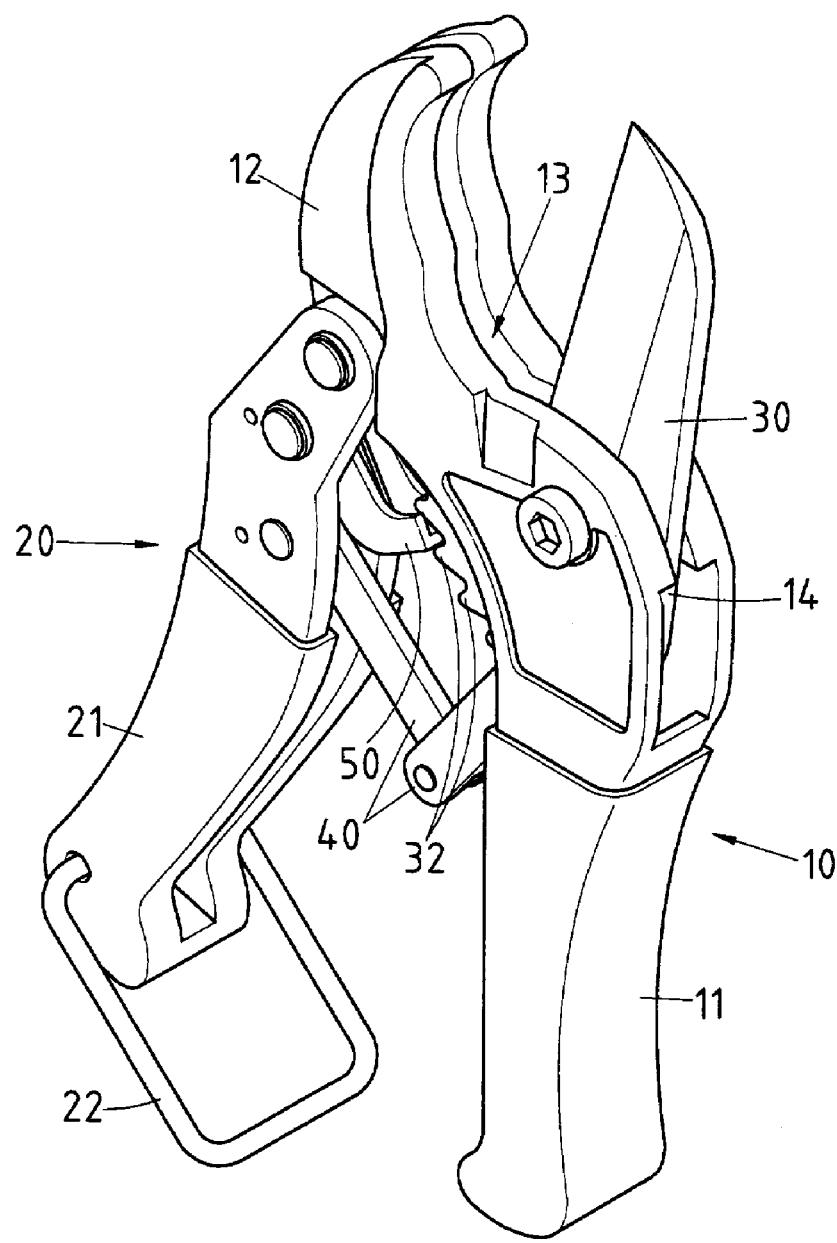
FIG. 1 shows a perspective view of the preferred embodiment of the present invention.
Figure 2:
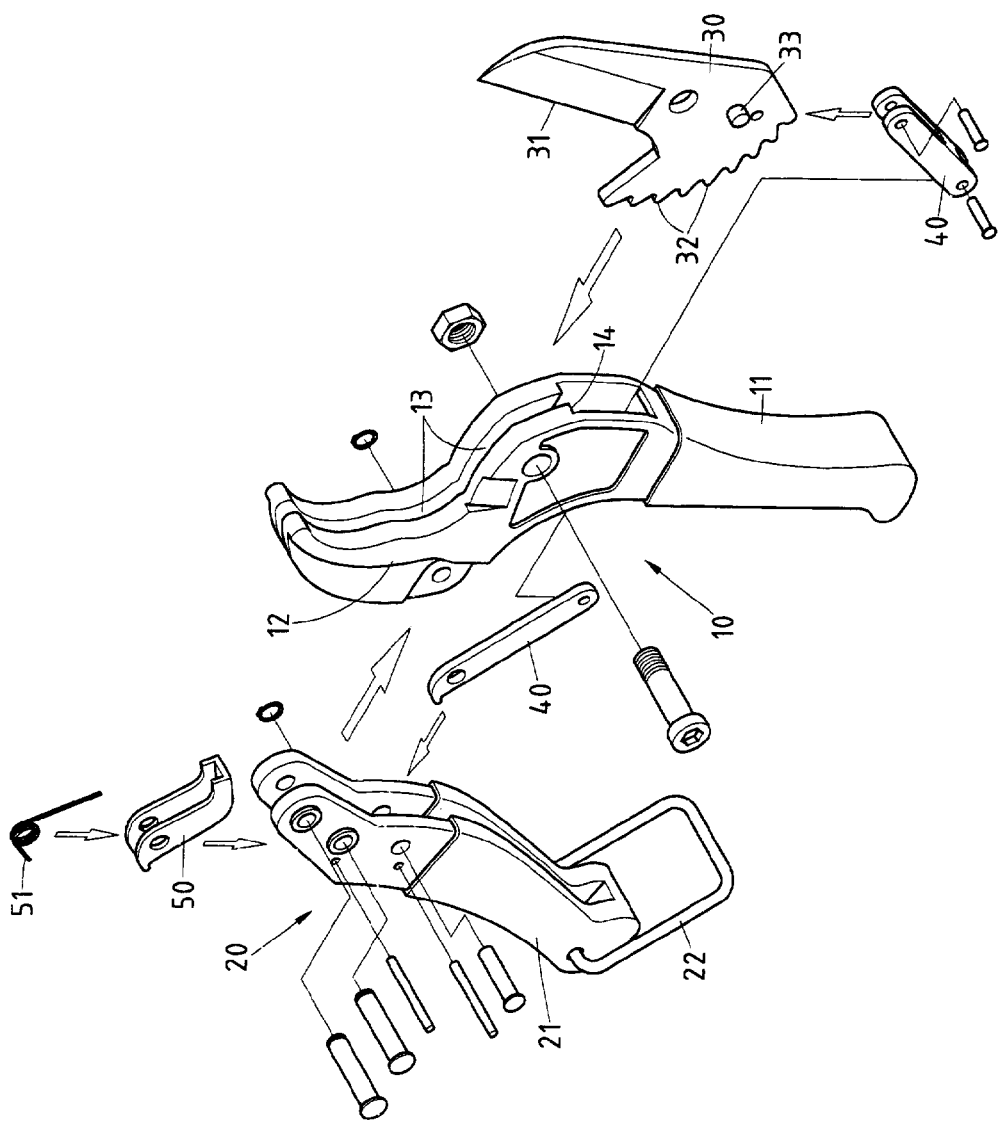
FIG. 2 shows an exploded view of the preferred embodiment of the present invention.

As shown in all drawings provided herewith, a water pipe shears of the preferred embodiment of the present invention comprise a primary handle 10, a secondary handle 20, a movable jaw 30, a connection rod 40, and a push claw 50.

The primary handle 10 is provided at one end with a grip 11, and at another end with a fixed jaw 12 which is in turn provided with a through slot 13. The slot 13 is provided with a stop edge 14.

The secondary handle 20 is provided at one end with a grip 21 which is opposite to the grip 11 of the primary handle 10 and is provided at the free end thereof with a restraining ring 22. The secondary handle 20 is fastened pivotally at another end to the fixed jaw 12 of the primary handle 10.

The movable jaw 30 is pivoted between the fixed jaw 12 of the primary handle 10 and the grip 11 of the primary handle 10 such that a blade 31 of the movable jaw 30 is opposite in location to the fixed jaw 12 of the primary handle 10. The movable jaw 30 is provided with a toothed portion 32 and a stop projection 33 in cooperation with the stop edge 14 of the primary handle 10.

The connection rod 40 is pivoted at one end with the secondary handle 20 and at another end with the lower end of the movable jaw 30.

Figure 3:
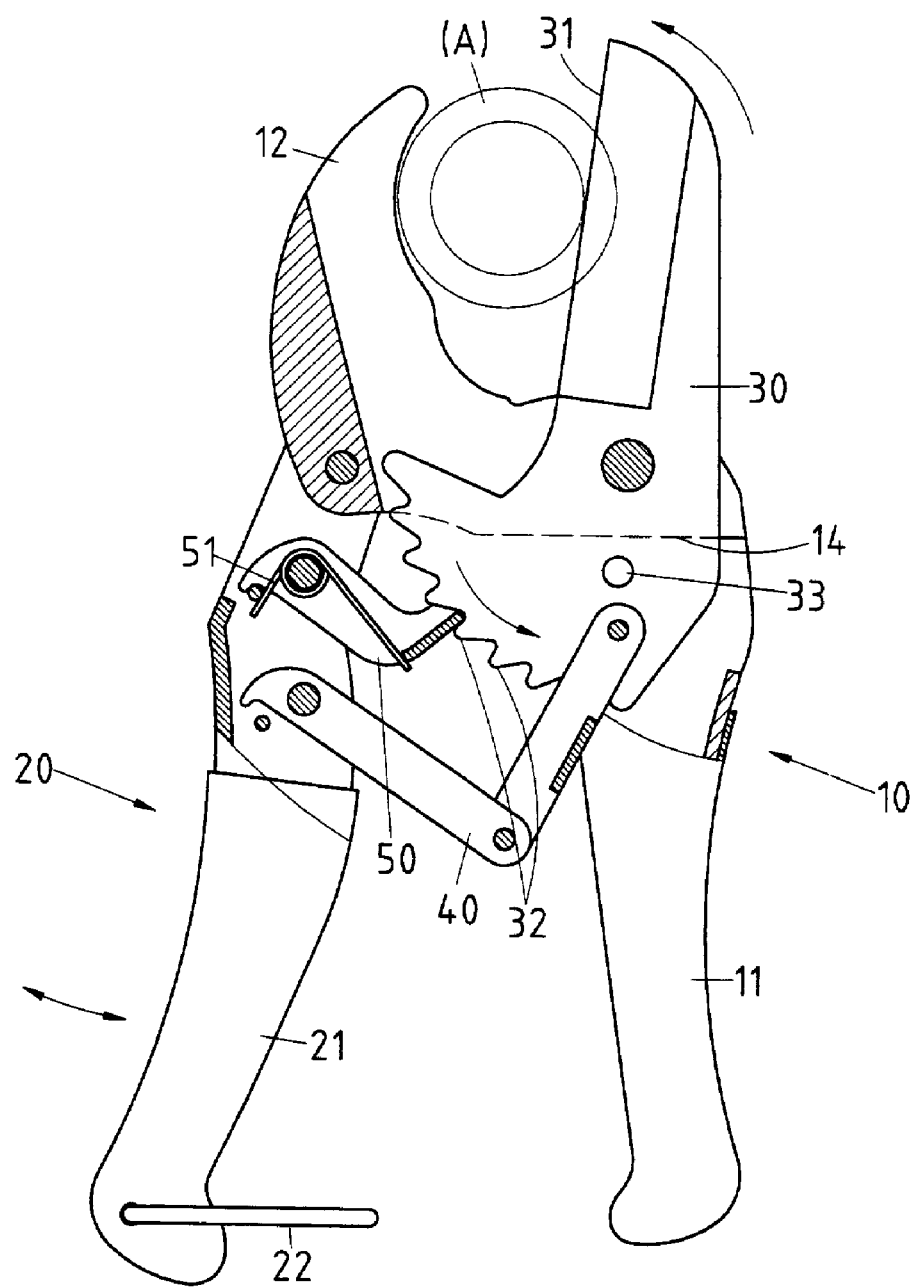
FIG. 3 shows a schematic view of the preferred embodiment of the present invention in action.

The push claw 50 is pivoted to the secondary handle 20 in conjunction with a cantilever spring 51 such that the push claw 50 is located between the fixed jaw 12 of the primary handle 10 and the connection rod 40. The push claw 50 is intended to push the movable jaw 30 to move progressively toward the fixed jaw 12 of the primary handle 10. The push claw 50 is actuated by the secondary handle 20 to urge the toothed portion 32 of the movable jaw 30, thereby resulting in the progressive movement of the movable jaw 30 toward the fixed jaw 12 so as to cut a water pipe "A" which is placed between the fixed jaw 12 and the movable jaw 30, as illustrated in FIG. 3. The pipe "A" is cut jointly by the scissor-like action of the fixed jaw 12 and the cutting edge of the blade 31 of the movable jaw 30.

Figure 4:
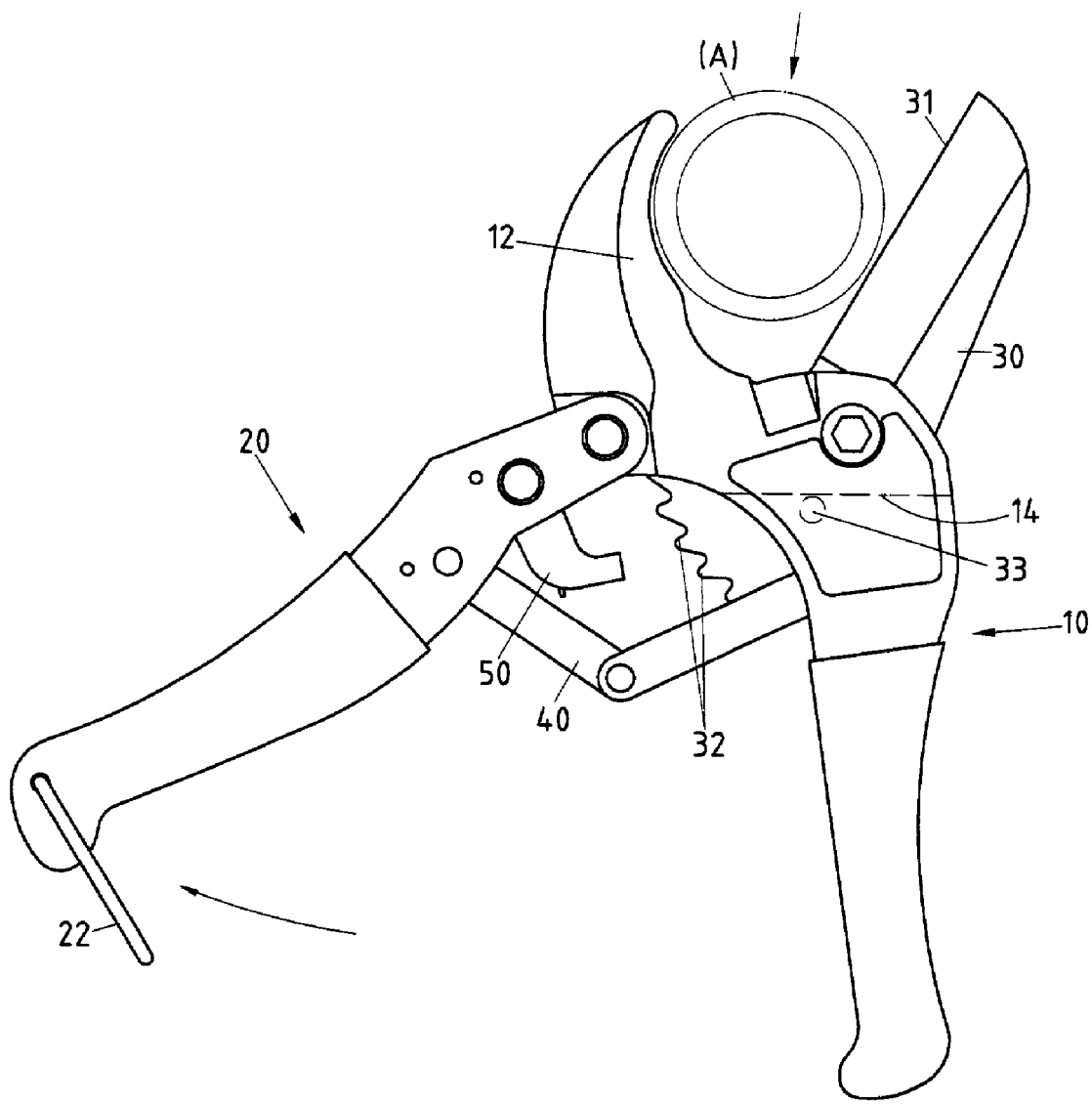
FIG. 4 shows another schematic view of the preferred embodiment of the present invention in action.

As illustrated in FIG. 4, when the secondary handle 20 is moved in the direction away from the primary handle 10, the connection rod 40 is actuated to pull the lower end of the movable jaw 30, thereby causing the blade 31 of the movable jaw 30 to move away from the fixed jaw 12 of the primary handle 10. The maximum angle is formed between the fixed jaw 12 and the blade 31 of the movable jaw 30 at the time when the stop projection 33 of the movable jaw 30 is stopped by the stop edge 14 of the primary handle 10.

Figure 5:
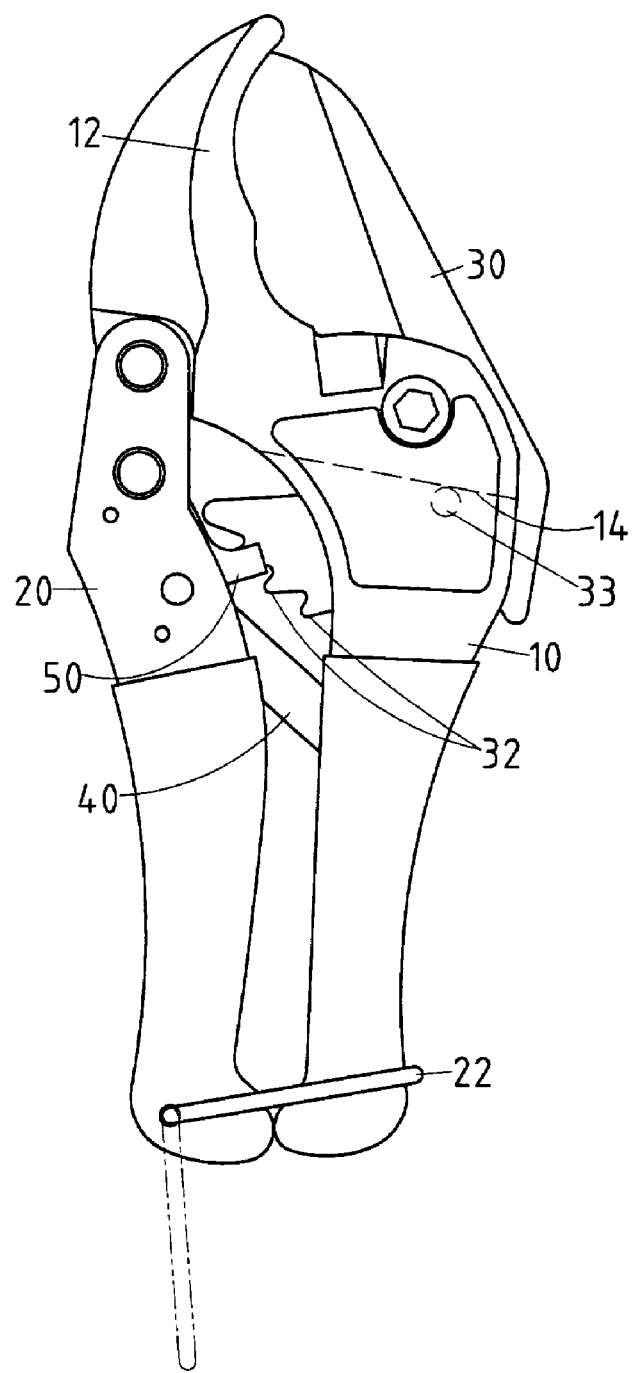
FIG. 5 shows another perspective view of the preferred embodiment of the present invention.

As shown in FIG. 5, the primary handle 10 and the secondary handle 20 are restrained by the restraining ring 22 which is attached to the free end of the grip 21 of the secondary handle 20.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claim.

I claim:

1. A pair of shears for cutting a pipe comprising:

a primary handle provided at one end with a grip and at another end with a fixed jaw having a through slot whereby said through slot is provided with a stop edge;

a secondary handle provided at one end with a grip opposite to said grip of said primary handle, said grip being provided at a free end thereof with a restraining ring, said secondary handle being pivotally fastened at another end thereof with said fixed jaw of said primary handle;

a movable jaw pivoted between said fixed jaw of said primary handle and said grip of said primary handle such that a blade of said movable jaw is opposite in location to said fixed jaw, said movable jaw provided with a toothed portion and a stop projection;

a connection rod pivoted at one end with said secondary handle, and at another end with a lower end of said movable jaw; and a push claw pivoted to said secondary handle in conjunction with a cantilever spring such that said push claw is located between said fixed jaw and said connection rod, and that said push claw is actuated by said secondary handle to urge said toothed portion of said movable jaw, thereby resulting in a progressive moment of said movable jaw toward said fixed jaw so as to cut a workpiece held between said fixed jaw and said movable jaw, whereby said movable jaw moves away from said fixed jaw at such time when said secondary handle is moved away from said primary handle so as to actuate said connection rod to pull the lower end of said movable jaw until said stop projection of said movable jaw is stopped by said stop edge of said primary handle.

* * * * *